(12) United States Patent
Kalamegham et al.

(10) Patent No.: US 8,490,060 B2
(45) Date of Patent: Jul. 16, 2013

(54) TRACING MEMORY UPDATES AND ACCESSES FOR DEBUGGING COMPUTER PROGRAMS

(75) Inventors: Praveen Kalamegham, Austin, TX (US); Basu Vaidyanathan, Austin, TX (US); Marcos A. Villarreal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 12/564,974

(22) Filed: Sep. 23, 2009

(65) Prior Publication Data
US 2011/0072418 A1  Mar. 24, 2011

(51) Int. Cl.
*G06F 9/44* (2006.01)
(52) U.S. Cl.
USPC .......................................... 717/127
(58) Field of Classification Search
None
See application file for complete search history.

(56) References Cited

U.S. PATENT DOCUMENTS

| | | | |
|---|---|---|---|
| 6,167,536 A | 12/2000 | Mann | |
| 6,732,307 B1 * | 5/2004 | Edwards | 714/724 |
| 7,765,526 B2 * | 7/2010 | Chen et al. | 717/124 |
| 8,055,855 B2 * | 11/2011 | Sarkar et al. | 711/150 |
| 2006/0277435 A1 | 12/2006 | Pedersen et al. | |
| 2006/0277441 A1 | 12/2006 | Edgar et al. | |
| 2007/0079292 A1 * | 4/2007 | Chen et al. | 717/127 |

* cited by examiner

*Primary Examiner* — Philip Wang
(74) *Attorney, Agent, or Firm* — Yudell Isidore Ng Russell PLLC

(57) ABSTRACT

A system, method, and computer program product for expediting the identification of computer program code that is the source of errors in the execution of a computer program. A debugger monitors a specified memory address, or group of addresses for updates, during execution of the computer program. In response to determining that a running computer program has updated the memory address, the processor executes a watchpoint handler to identify the source of errors in a computer program executing in a data processing system. The watchpoint handler gathers trace information associated with the faulty processing thread, and records the trace information to a memory location. The watchpoint handler may also apply filters to the trace information to identify the source of the error, saving valuable debugging time.

17 Claims, 4 Drawing Sheets

TRACING MEMORY UPDATES AND ACCESSES FOR DEBUGGING COMPUTER PROGRAMS

BACKGROUND

1. Technical Field

This application generally relates to software development in a data processing system. In particular, embodiments this application relates to systems and methods for identifying the source of an error in computer code.

2. Description of the Related Art

One task in the development of a computer program is identifying errors in the computer program. Typically, a "debugger" program is used to assist in identifying any errors in the computer program under development. Conventional debuggers typically support two primary operations. A first operation supported by conventional debuggers is a "step" function which permits the processing of instructions, one at a time, in a computer program and allows the results of each instruction to be viewed upon completion. Conventional debuggers also support a breakpoint operation, which permits identification of a break point. A break point is an instruction at which execution of a computer program is halted. As the debugger executes the computer program, the program executes normally until a breakpoint is reached. Upon reaching the breakpoint, the program stops execution and displays the results, up to the breakpoint, of the computer program.

Step operations and breakpoints are typically used together to simplify the debugging process. Specifically, a common debugging procedure is to set a breakpoint at the beginning of a desired set of instructions to be analyzed, and then begin execution of the program undergoing debugging. Execution would then automatically halt at the established breakpoint. The program may then be analyzed by stepping through the desired set of instructions line-by-line, using a step operation. Consequently, isolation and analysis of a particular set of instructions can be expedited by not having to step through irrelevant portions of a computer program. However, setting breakpoints and halting execution of a program undergoing debugging is still onerous because of the amount of attention that must be given to each step.

BRIEF SUMMARY

Disclosed are a system, method, and computer program product for expediting the identification of computer program code that is the source of errors in the execution of a computer program. A debugger monitors a specified memory address, or group of addresses for updates, during execution of the computer program. In response to determining that a running computer program has updated the memory address, the processor executes a watchpoint handler to identify the source of errors in a computer program executing in a data processing system. The watchpoint handler gathers trace information associated with the faulty processing thread, and records the trace information to a memory location. The watchpoint handler may also apply filters to the trace information to identify the source of the error, saving valuable debugging time.

In some embodiments, the method further provides that the trace information comprises call stack information or a thread identifier. The method may also involve filtering the trace information based on a particular thread identifier or a pattern of call sequence. The method additionally can entail recording trace information in response to a determination that execution of the computer program has caused an error. In one embodiment, the method also provides that specifying, monitoring, and recording are performed without halting execution of the computer program. In yet other embodiments, the method additionally provides that the memory address is specified after the program begins executing in the data processing system.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION

Figure 1:
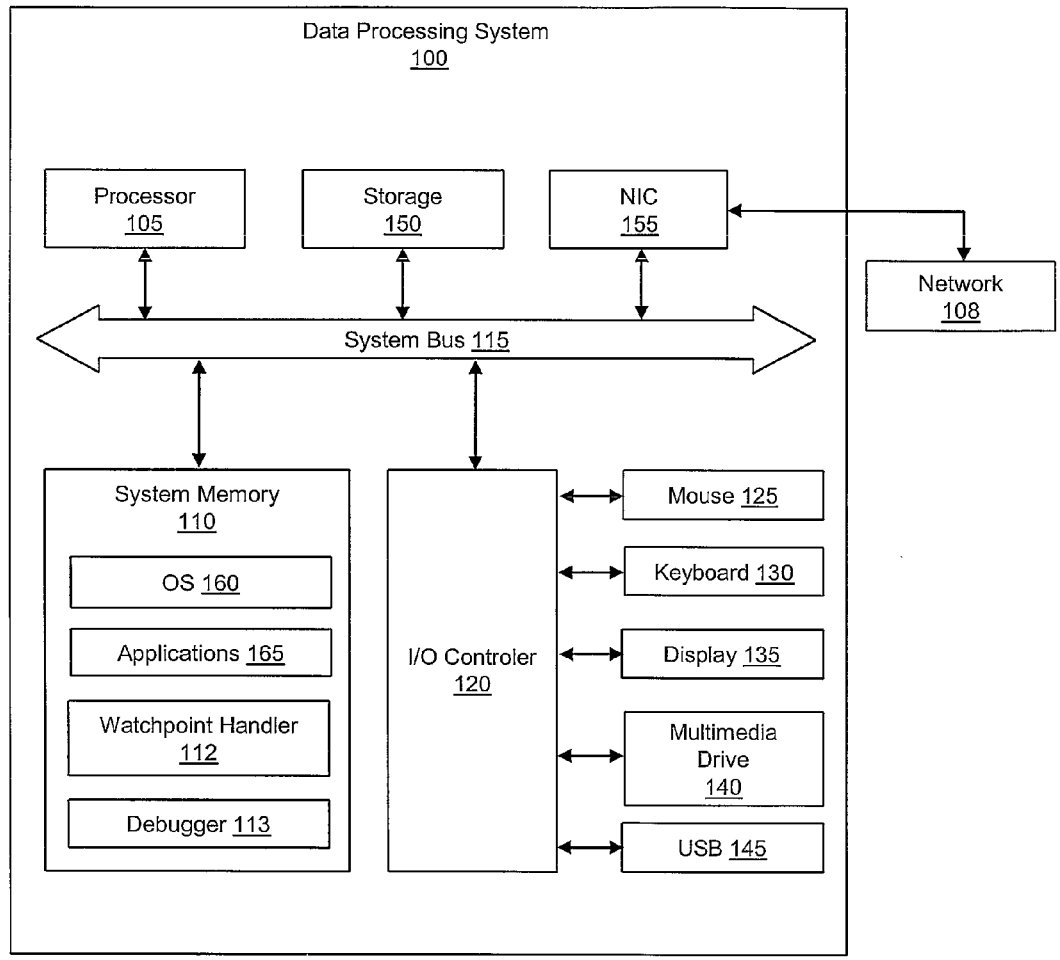
FIG. 1 is a high level schematic diagram of a data processing system, in accordance with one embodiment of the invention.

Disclosed is a system, method, and computer program product for expediting the identification of computer program code that is the source of errors in the execution of a computer program. In one embodiment, the invention is directed to a method of identifying the source of errors in a computer program executing in a data processing system. The method involves specifying a memory address to be monitored, and during execution of the computer program, monitoring the memory address for updates to the memory address. The method further entails, in response to determining that the computer program has updated the memory address, recording trace information associated with the computer program.

In some embodiments, the method further provides that the trace information comprises call stack information or a thread identifier. The method may also involve filtering the trace information based on a particular thread identifier or by a pattern of call sequence. The method additionally can entail recording trace information in response to a determination that execution of the computer program has caused an error. In one embodiment, the method also provides that specifying, monitoring, and recording are performed without halting execution of the computer program. In yet other embodiments, the method additionally provides that the memory address is specified after the program begins executing in a data processing system.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

In general terms, debugger systems (software, hardware, or combination thereof) disclosed herein provide functionality for monitoring and analyzing the execution of computer programs. In one embodiment, a debugger places a watch, or breakpoint, on a specific data memory address or plurality of memory addresses. The watch includes monitoring or recording information associated with an event, such as an update or access of a data memory address. In some cases, the watch causes execution of code under analysis to break into the debugger system when the specified memory address is updated. In other implementations, execution of a computer program subject to debugging is not interrupted; rather, when the computer program updates the specified memory address, a watchpoint handler is called to collect and record identifier information, trace information, and call chain information associated with the process at the time of updating the specified memory address. That information is termed herein, at times, "trace context." The watchpoint handler itself may also autonomously determine whether to keep or discard the collected information. This avoids an over-sized memory buffer by keeping trace context with the watchpoint handler In some inventive embodiments discussed in further detail below, a watchpoint handler receives information about a faulting thread, which information can include the thread identifier and one or more levels of call stack trace with symbols. This information can be stored in a memory buffer. This procedure can save a substantial amount of debugging time because, if a memory corruption occurs at the watch memory address, the saved call stack trace can be used to quickly identify the faulting code. Moreover, the use of memory address watchpoints allows dynamic tracing of any memory address updates, which is to be contrasted to the typical, non-dynamic debugging procedure where breakpoints are set within the code of the computer program subject to debugging.

In certain embodiments, processing of the recorded trace information is automated with filtering mechanisms, which can be based on, for example, a particular thread identifier or a pattern of call sequence. The pattern of call sequence specifies a sequencing of one or more filters for identifying errors in the call stack information. In one implementation, the filtering mechanism can be placed in the watchpoint handler to expedite the diagnosis by avoiding unwanted states changes and runtime overhead associated with the diagnosis. In some embodiments, a trace buffer, configured to collect call stack chains placed inside a watchpoint handler, is particularly useful when a memory update that is being watched resides in a memory segment (shared mutex, for example) that is common among multiple processes. Since threads of multiple processes can share a memory address in a shared memory segment, this mechanism can quickly identify the offending thread of one of these processes that corrupts the memory location. In some cases, collecting call stack chain traces inside a signal handler of a specified process being watched allows quick and accurate identification of a faulting thread by checking the call stack chains for an anomaly in a particular expected lockword memory update.

FIG. 1 depicts a block diagram of data processing system 100. Data processing system 100 is an exemplary computing device that can be used to implement the current invention. In one embodiment, data processing system 100 includes at least one processor 105 coupled to system memory 110 via system bus 115. System memory 110 is a lowest level of memory and may include, for example, Dynamic Random Access Memory (DRAM) or flash memory. Data processing system 100 can include additional volatile memory, such as cache memory, registers, and buffers. Input/Output (I/O) controller 120 is coupled to system bus 115 and provides connectivity and control for input devices, such as mouse 125 and keyboard 130, and output devices, such as display 135. Multimedia drive 140 (for example, CDRW or DVD drive) and universal serial bus (USB) hub 145 can be coupled to I/O controller 120. Multimedia drive 140 and USB hub 145 may operate as both input and output (storage) mechanisms. Data processing system 100 can also include storage 150, within which data, instructions, or code can be stored. Network interface card (NIC) 155, coupled to system bus 115, enables data processing system 100 to connect to an access network 108. Network 108 may be a local-network, or a wide-area network, such as an Internet.

In addition to the above described hardware components of data processing system 100, various features can be provided via software or firmware code or logic stored in system memory 110, or other data storage (for example, storage 150), and executed by processor 105. In one embodiment, data, instructions, or code from storage 150 populates the system memory 110. Thus, system memory 110 can include software or firmware components, such as operating system (OS) 160, applications 165, watchpoint handler 112, and debugger 113. OS 160 may be, for example, Microsoft Windows®, GNU®, Linux®, or Advanced Interactive eXecutive (AIX®). In some embodiments, components or code of OS 160 may be combined with that of watchpoint handler 112 to collectively provide various functional features of the invention when processor 105 executes the corresponding code.

In certain embodiments, processor 105 executes applications 165, watchpoint handler 112, and OS 160, which supports the user interface features of watchpoint handler 112. In some embodiments, watchpoint handler 112 provides several graphical user interfaces (GUI) to enable user interaction with, or manipulation of, the functional features of watchpoint handler 112. Among exemplary software code provided by watchpoint handler 112 is software code for: (a) specifying a memory address to be monitored; (b) during execution of one or more computer programs, processes, or threads, monitoring the memory address for updates or accesses to the memory address; and (c) in response to determining the memory address has been updated, recording trace information associated with the computer program, process, or thread that has accessed or updated the memory address. The memory address that is monitored may be automatically set by the watchpoint handler, depending on memory addresses typically used by the program being watched. In an alternate embodiment, the watched memory addresses may be set by an administrator. Depending on the specific embodiment, watchpoint handler 112 can include some or all of the listed code functions (a)-(c). Additionally, watchpoint handler 112 can include program code for filtering the trace information, as well as other functionality further discussed below. According to the illustrative embodiment, when processor 105 executes watchpoint handler 112, data processing system 100 initiates a series of processes that enable the above functional features as well as additional features or functionality, which are described below with reference to FIGS. 2-4.

Those of ordinary skill in the relevant technology will appreciate that the hardware and basic configuration depicted in FIG. 1 may vary. For example, other devices or components may be used in addition to or in place of the hardware depicted. The depicted example is not meant to imply architectural limitations with respect to the present invention. Data processing system 100 may be a server computing device, personal computing device (e.g., laptop, desktop, etc.), mobile computing device, or any device having computing functionality. In other embodiments, data processing system 100 may be a mobile telephone, cellular phone, radio phone, personal digital assistant, smart phone, etc.

Figure 2:
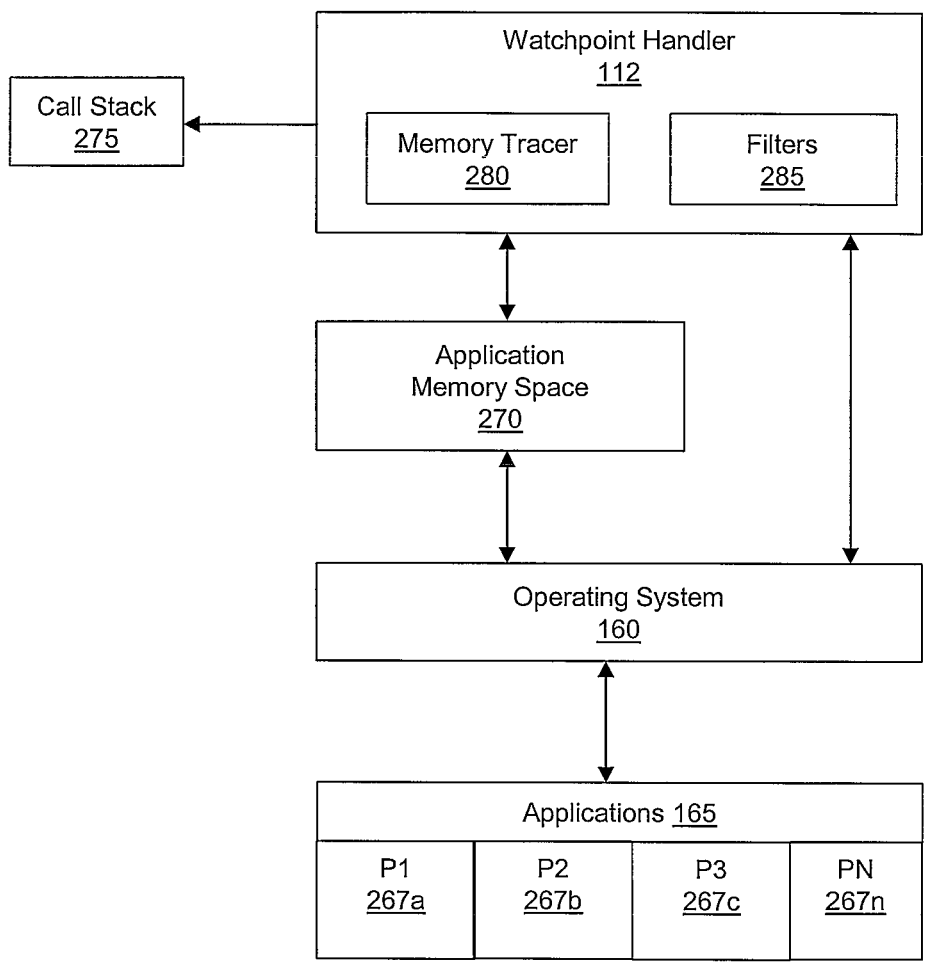
FIG. 2 is a functional block diagram of exemplary components that can be used within the data processing system of FIG. 1 to perform the tracing functions provided, in accordance with one embodiment of the invention.

FIG. 2 is a functional block diagram of exemplary components that can be used with the data processing system of FIG. 1 to perform the tracing functions provided, in accordance with one embodiment of the invention. As show in FIG. 2, debugger 113 is configured to communicate with OS 160 and application memory space 270. It should be noted that for purposes of illustration, watchpoint handler 112, applications 165, and call stack 275 are shown in FIG. 2 as components outside of application memory space 270. However, it is understood that in actual implementation, debugger 113, watchpoint handler 112, applications 165, and call stack 275 are executed at least partially within application memory space 270. In some embodiments, application memory space 270 is a memory subset of system memory 110 and/or storage 150 of data processing system 100.

Although watchpoint handler 112 is shown in FIG. 2 as having a direct communication channel to application memory space 270. In other embodiments, watchpoint handler 112 may be configured to access application memory space 270 only via OS 160. That is, in some embodiments, OS 160 controls communication between watchpoint handler 112 and application memory space 270. OS 160 is coupled to application memory space 270 to enable utilization of application memory space 270 by applications 165 and/or watchpoint handler 112. Applications 165 may include a number of applications 267a-n (P1-PN). In one implementation, applications 165 include at least one application 267 that is subject to a debugging process.

Watchpoint handler 112 and debugger 113 may also be coupled to call stack 275. Call stack 275 generally holds a return address for returning to a calling program. The Call stack returns to the called program after the called program (or function, driver, module etc.) has completed its work, and has saved a copy of the calling program's base pointer—i.e., a pointer to the first or "base" location on the stack associated with the calling program. Call stack 275 can also be used to pass parameters to the called program. Call stack 275 contains layers of function calls.

It should be understood that the functionality provided by watchpoint handler 112 can be incorporated into, or be configured to cooperate with, known debugging technologies. In one embodiment, watchpoint handler 112 can be provided with memory tracer module 280 and filters module 285. Memory tracer module 280 can store the information from call stack 175 in a portion of memory of application memory space 270 or storage 150, for example. Filters 285 module is configured to facilitate the filtering of the information collected or recorded by tracer module 280. In one embodiment, filters module 285 allows filtering trace data by thread identifier or pattern of function calls. Memory tracer module 280 is configured to monitor one or more specified memory addresses (usually residing in application memory space 270). When the specified memory address is accessed and/or updated by application P2 267b, for example, memory tracer module 280 records information stored in call stack 275. Among the information recorded by memory tracer module 280 can be an identifier for an executing thread of application P2 267b. Additionally, memory tracer module 280 can record one or more layers of function calls originated by application P2 267b or one or more processes or threads associated with application P2 267b.

Figure 3:
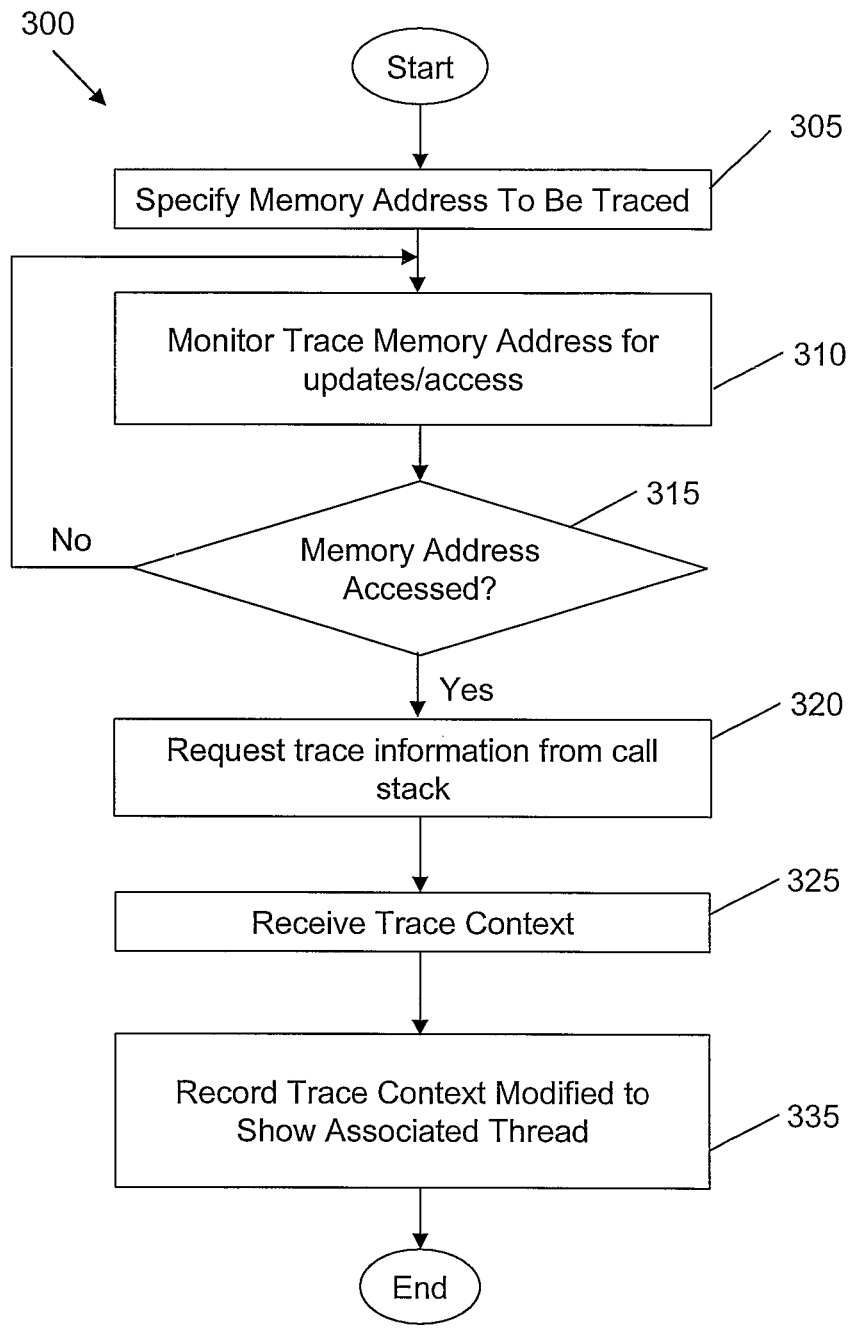
FIG. 3 is a flow chart of a process by which certain functionality of one embodiment the invention can be implemented.

With reference now to FIG. 3, a method 300 that can be implemented in data processing system 100 is illustrated. In one embodiment, method 300 can be used to facilitate the debugging of a computer program. In one implementation, method 300 involves the monitoring of a memory address, which can be shared by a plurality of executing processes, such as a share mutex. The memory address may be locked or unlocked by an executing process for exclusive access. At step 305, a memory address to be monitored or traced is specified. In some cases, the memory address is specified manually by, for example, a user of data processing system 100. In other cases, the memory address can be specified or provided via computer logic, which may be configured to automatically or semi-automatically debug a computer program. In one implementation, memory tracer module 280 receives an input of the specified memory address to be traced. Setting the trace, i.e., specifying the memory address to be traced, can be performed independently of any given executing process that accesses the specified memory address, and can reside in application memory space 170. It is to be understood that an executing process can be a thread associated with a computer application or program that is executing in the data processing system.

Once the memory address to be traced has been specified, memory tracer module 280 monitors (block 310) all updates or access to the specified memory address. At a decision step 315 of method 300, memory tracer module 280 determines whether the specified memory address has been updated or accessed by an application 267. An update to the specified memory address may or may not change a value stored in the specified memory address. The update may specify a write instruction for the specified memory address. If the specified memory address has not been accessed or updated, memory tracer module 280 continues monitoring the specified memory address, and the process loops in an iterative fashion back to block 310.

In response to a determination that the specified memory address has been updated or accessed, memory tracer module 280 requests trace context information from call stack 275 (block 320). The requested trace context information is then received (block 325). The trace context information can include two or more levels of call stack histories, corresponding to the last two or more prior operations. The received trace information can then be utilized to determine what portion of a program code, process, or thread has caused an error in the execution of application 267. The received trace information can then be used to record a trace context (block 335), which can be stored in a storage location of application memory space 270 or storage 150. The trace context information may be associated with, among other things, a thread or process identifier, value stored at the memory address, a pattern of function calls, call stack, etc. Additionally, information of the error or cause of the error may also be stored in the trace context information. Call stack 275 specifies prior operations executed by a thread and may include parameters (i.e., symbols) associated with such prior operations. The trace information can be stored in non-volatile memory for filtering or analysis. In one embodiment, the trace information is recorded in a database.

In some embodiments, method 300 provides for setting a trace on a given memory address, while a plurality of process are reading or writing values to memory, without interruption of the executing processes. It is also noted that the memory address to be traced can be specified during process execution, thereby providing the ability to scan and record trace information for one or more specified memory addresses.

Figure 4:
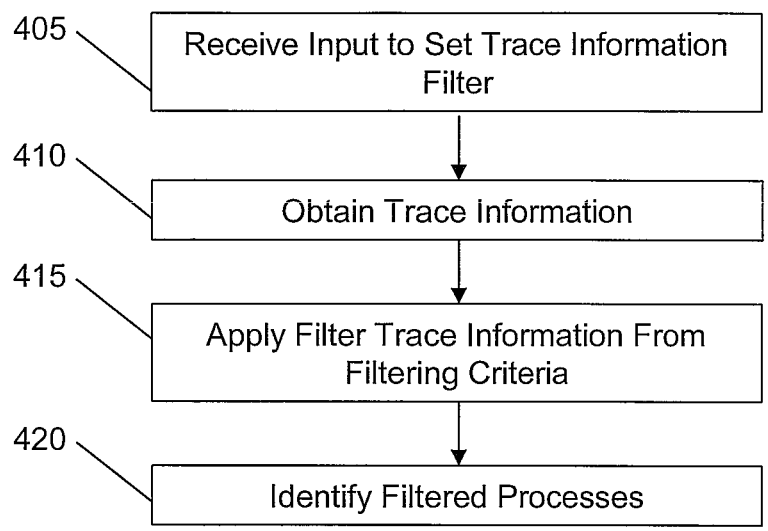
FIG. 4 is a flow chart of another process by which certain functionality of one embodiment the invention can be implemented.

Referencing FIG. 4, a method 400 that can be implemented in data processing system 100 and along with method 300 will be described. In one implementation, method 400 can be used to filter trace information, and thereby, facilitate the debugging of a computer program. In one embodiment, method 400 is employed to filter trace information prior to the trace information being stored for longer term access or use. In one embodiment, filters module 285 of watchpoint handler 112 is configured to perform the filtering functionality provided by method 400. At a step 405, filters module 285 receives input associated with setting trace information filters. This input can be provided manually by a user of data processing system 100, or the input can be provided by computer logic configured to facilitate the debugging of a computer program. The trace information filters may also specify a process identifier for conditional filtering based on that process identifier. Other conditional filtering criteria, such as pattern of function calls, based on the stored trace information may be specified.

Watchpoint handler 112 obtains trace information (block 410) from a storage area of application memory space 270 or storage 150. In one embodiment, filters module 285 accesses or receives the trace information before the trace information is recorded to the storage area of application memory space 270 or storage 150. In other embodiments, filters module 285 receives or accesses the trace information after watchpoint handler 112 has caused the trace information to be recorded. At step 415, filters module 285 applies the specified filtering criteria to the received trace information. Application of the specified filtering criteria can result in a substantial reduction of trace information that needs to be analyzed to identify the portion of code in a process or thread that has caused an error in the execution of application 267. Filters module 285 next outputs one or more filtered processes of interest (block 420). The filtered trace information can be further analyzed to identify computer code that is responsible for causing errors in execution of application 267.

In the flow charts and/or functional block diagrams above, one or more of the methods can be embodied in a computer writable and/or readable storage medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of a watchpoint handler of a data processing system identifying the source of errors in one or more computer programs executing on the data processing system, the method comprising:

the watchpoint handler of the data processing system automatically specifying at least one memory address to be monitored, wherein the at least one specified memory address is common among two or more processes;

a debugger of the data processing system placing a watch on the at least one specified memory address;

during execution of the one or more computer programs, the watchpoint handler dynamically monitoring the at least one specified memory address for updates or accesses thereto;

in response to determining that the one or more computer programs have accessed or updated the at least one specified memory address, the watchpoint handler retrieving trace information associated with the one or more computer programs that accessed or updated the at least one specified memory address, wherein the trace information comprises two or more levels of call stack information history corresponding to two or more prior operations;

the watchpoint handler of the data processing system determining, based on the retrieved trace information, if an error has occurred at the at least one specified memory address; and in response to determining that an error has occurred, the watchpoint handler recording a trace context, wherein the trace context includes at least one of: information associated with the error and the cause of the error;

wherein the watchpoint handler further comprises a trace buffer for collecting one or more call stack chains placed inside the watchpoint handler, and wherein automatically specifying, monitoring, and recording are performed without halting execution of the one or more computer programs.

2. The method of claim 1, further comprising a filtering mechanism on the data processing system for filtering the trace information based on a pattern of call sequence, wherein the pattern of call sequence specifies a sequencing of one or more filters that is applied to the retrieved trace information to identify errors in the call stack information.

3. The method of claim 1, wherein a memory tracer module on the data processing system records the two or more levels of call stack information stored in a call stack, the call stack information further comprising an identifier of an executing process.

4. The method of claim 1, wherein:
the trace information comprises a thread identifier of the executing thread within which the error occurred, and wherein the trace information is filtered based on a particular thread identifier; and
the at least one specified memory address is specified while the one or more computer programs are executing.

5. The method of claim 1, wherein the trace context is associated with at least one of: a thread or process identifier, a value stored at the at least one specified memory address, a pattern of function calls, and a call stack.

6. The method of claim 1, wherein the trace context includes identifier information, trace information, and call chain information associated with the one or more computer programs at the time of updating or accessing the at least one specified memory address.

7. A data processing system comprising:
a processor;
a memory coupled to the processor;
a watchpoint handler executing on the processor that:
automatically specifies, at least one memory address to be monitored, wherein a debugger of the data processing system places a watch on the at least one specified memory address and the at least one specified memory address is common among two or more processes;
during execution of the one or more computer program, dynamically monitors the at least one specified memory address for updates or accesses thereto;
in response to determining that the one or more computer programs have accessed or updated the at least one specified memory address, retrieves trace information associated with one or more computer programs that accessed or updated the at least one specified memory address, wherein the trace information comprises two or more levels of call stack information history corresponding to two or more prior operations; determines, based on the retrieved trace information, if an error has occurred at the at least one specified memory address; and
in response to determining that an error has occurred, recording a trace context, wherein the trace context includes at least one of: information associated with the error and the cause of the error;
wherein the watchpoint handler further comprises a trace buffer for collecting one or more call stack chains placed inside the watchpoint handler, and wherein automatically specifying, monitoring, and recording are performed without halting execution of the one or more computer programs.

8. The data processing system of claim 7, the debugging logic further comprising computer logic for filtering the trace information, via a filtering mechanism, based on a pattern of call sequence, wherein the pattern of call sequence specifies a sequencing of one or more filters that is applied to the retrieved trace information to identify errors in the call stack information.

9. The data processing system of claim 7, wherein:
a memory tracer module records the two or more levels of call stack information stored in a call stack, the call stack information further comprising an identifier of an executing process; and
the at least one specified memory address is specified while the one or more computer programs are executing.

10. The data processing system of claim 7, wherein the trace information comprises a thread identifier of the executing thread within which the error occurred, and wherein the trace information is filtered based on a particular thread identifier.

11. The data processing system of claim 7, wherein the trace context is associated with at least one of: a thread or process identifier, a value stored at the at least one specified memory address, a pattern of function calls, and a call stack.

12. The data processing system of claim 7, wherein the trace context includes identifier information, trace information, and call chain information associated with the one or more computer programs at the time of updating or accessing the at least one specified memory address.

13. A computer program product embodied in a computer-readable storage device having a plurality of instructions embodied therein, wherein the plurality of instructions, when executed by a processor, allows a machine to perform the actions of:
automatically specifying, by a watchpoint handler, at least one memory address to be monitored, wherein the memory address is specified while the computer program is executing, wherein a debugger places a watch on the at least one specified memory address and the at least one specified memory address is common among two or more processes;
during execution of the one or more computer programs, the watchpoint handler dynamically monitoring the at least one specified memory address for updates or accesses thereto;
in response to determining that the one or more computer programs have accessed or updated the at least one specified memory address, the watchpoint handler retrieving trace information associated with the one or more computer programs that accessed or updated the at least one specified memory address, wherein the trace information comprises two or more levels of call stack information history corresponding to two or more prior operations;
the watchpoint handler determining, based on the retrieved trace information if an error has occurred at the at least one specified memory address; and
in response to determining that an error has occurred, the watchpoint handler recording a trace context, wherein the trace context includes at least one of: information associated with the error and the cause of the error;
wherein the watchpoint handler further comprises a trace buffer for collecting one or more call stack chains placed inside the watchpoint handler, and wherein automatically specifying, monitoring, and recording are performed without halting execution of the one or more computer programs.

14. The computer program product of claim 13, wherein the plurality of instructions further comprises instructions for:

Filtering the trace information based on a pattern of call sequence, wherein the pattern of call sequence specifies a sequencing of one or more filters that is applied to the retrieved trace information to identify errors in the call stack information.

15. The computer program product of claim 13, wherein a memory tracer module records the two or more levels of call stack information stored in a call stack, the call stack information further comprising an identifier of an executing process.

16. The computer program product of claim 13, wherein:

the trace information comprises a thread identifier of the executing thread within which the error occurred, and wherein the trace information is filtered based on a particular thread identifier.

17. The computer program product of claim 13, wherein:

the trace context is associated with at least one of: a thread or process identifier, a value stored at the at least one specified memory address, a pattern of function calls, and a call stack; and the trace context includes identifier information, trace information, and call chain information associated with the one or more computer programs at the time of updating or accessing the at least one specified memory address.

\* \* \* \* \*